US007017115B2

(12) United States Patent
Hayashi

(10) Patent No.: US 7,017,115 B2
(45) Date of Patent: Mar. 21, 2006

(54) PORTABLE INFORMATION TERMINAL EQUIPMENT AND DISPLAY METHOD THEREFOR

(75) Inventor: Keiichi Hayashi, Kanagawa (JP)

(73) Assignee: NEC Corporation, Tokyo (JP)

( * ) Notice: Subject to any disclaimer, the term of this patent is extended or adjusted under 35 U.S.C. 154(b) by 463 days.

(21) Appl. No.: 10/003,085

(22) Filed: Dec. 6, 2001

(65) Prior Publication Data
US 2002/0105540 A1 Aug. 8, 2002

(30) Foreign Application Priority Data
Dec. 7, 2000 (JP) ............................. 2000/372993

(51) Int. Cl.
*G06F 3/00* (2006.01)
*G09G 5/00* (2006.01)
*G09G 5/30* (2006.01)

(52) U.S. Cl. ...................... 715/738; 715/730; 715/733; 715/764; 715/864; 709/203; 709/217; 345/649

(58) Field of Classification Search ................ 715/723, 715/730, 733, 738, 740–743, 748, 751, 761, 715/764, 864, 700, 716–719; 707/10; 709/201–205, 709/217, 218; 345/649, 738, 764, 864, 867
See application file for complete search history.

(56) References Cited

U.S. PATENT DOCUMENTS 5,796,945 A * 8/1998 Tarabella .................... 709/219
5,819,284 A * 10/1998 Farber et al. ................ 709/203
5,864,347 A * 1/1999 Inoue .......................... 345/566
6,137,468 A * 10/2000 Martinez et al. ............ 345/649
6,268,857 B1 * 7/2001 Fishkin et al. .............. 345/863
6,326,985 B1 * 12/2001 Tazoe et al. ................. 345/764
6,466,198 B1 * 10/2002 Feinstein .................... 345/158

FOREIGN PATENT DOCUMENTS

| CN | 1274207 A | 11/2000 |
| EP | 1 052 598 A2 | 11/2000 |
| JP | WO97/09683 | 3/1997 |
| JP | 10-257190 | 9/1998 |

(Continued)

OTHER PUBLICATIONS

Stefan Gessler et al, " PDA as mobile WWW browsers", 1995, Elsevier Science B.V., Computer Networks and ISDN System 28 (1995) 53-59.*

(Continued)

*Primary Examiner*—X. L. Bautista
(74) *Attorney, Agent, or Firm*—McGinn IP Law Group, PLLC

(57) ABSTRACT

A portable information terminal equipment with a browser function includes an image information acquisition section for acquiring image information constituted by at least image data and display sequence information of the image data from a Web server through a communication line, a storage section for storing the image information acquired by the image acquisition section, and a display section for displaying image data on the basis of the display sequence information contained in the image information stored in the storage section. A display method for the portable information terminal equipment is also disclosed.

18 Claims, 8 Drawing Sheets

U.S. PATENT DOCUMENTS

| | | | |
|---|---|---|---|
| 6,507,351 B1 * | 1/2003 | Bixler | 345/810 |
| 6,567,983 B1 * | 5/2003 | Shiimori | 725/105 |
| 6,569,097 B1 * | 5/2003 | McMorrow et al. | 600/437 |
| 6,621,508 B1 * | 9/2003 | Shiraishi et al. | 345/810 |
| 6,650,889 B1 * | 11/2003 | Evans et al. | 455/412.1 |
| 6,674,439 B1 * | 1/2004 | Shin et al. | 345/501 |
| 2002/0063690 A1 * | 5/2002 | Chung et al. | 345/168 |
| 2002/0085024 A1 * | 7/2002 | White et al. | 345/738 |

FOREIGN PATENT DOCUMENTS

| | | |
|---|---|---|
| JP | 10-336238 | 12/1998 |
| JP | 11-150759 | 6/1999 |
| JP | 11-250009 | 9/1999 |
| JP | 2000-278371 | 6/2000 |

OTHER PUBLICATIONS

Japanese Office Action dated Oct. 26, 2004 and partial English translation.

Chinese Office Action dated Jun., 20, 2003.

European Search Report dated Jul. 12, 2002.

http://web.archive.org/web/20001109140400/www.fallsview.com, "Sheration Fallsview Hotel & Conference Centre", Nov. 1999, 2 pages total.

* cited by examiner

PORTABLE INFORMATION TERMINAL EQUIPMENT AND DISPLAY METHOD THEREFOR

BACKGROUND OF THE INVENTION

1. Field of the Invention

The present invention relates to a portable information terminal equipment and a display method for the equipment and, more particularly, to a portable information terminal equipment which has a browser function for acquiring image data to be displayed on the screen during a standby period or at the time of origination/termination of mail, a telephone call, or the like from the server side, and can make settings for displaying the image data acquired by using the browser function on the screen during a standby period or at the time of origination/termination of mail, a telephone call, or the like, and a display method for the equipment.

2. Description of the Prior Art

In displaying image data on the screen at the time of termination, a conventional portable information terminal equipment is designed to either display a still image or animation Gif image or create a program defining the action of an animation image to be displayed for each operation so as to display the corresponding animation image.

In displaying a still image or animation Gif image, however, image data must be prepared every time an image is displayed. If only one image data is shared, identical images are displayed for the respective operations. This makes it impossible to discriminate operation conditions from each other on the basis of displayed images. On the other hand, to discriminate operation conditions from each other, many image are required, and hence a large memory capacity is required.

In the case where a program for defining the action of an animation image to be displayed is created for each operation, image data must be prepared for each operation, and a program for image display is also required for each function. As a consequence, a large memory capacity is required.

In addition, in acquiring image data from a network or the like, image data must be prepared for each display operation and function, resulting in a deterioration in data creation efficiency on the data distribution service side.

Furthermore, in a portable information terminal equipment, when different image data are to be displayed for the respective functions and operations, a large memory capacity is required to store image data.

SUMMARY OF THE INVENTION

The present invention has been made in consideration of the above problems in the prior art, and has as its first object to provide a portable information terminal equipment with a sequence function which writes sequence information representing an image display pattern, together with image data to be displayed, and performs image display based on the sequence information in the image which the portable information terminal equipment acquires from a Web server, and a display method for the equipment.

It is the second object of the present invention to provide a portable information terminal equipment which writes a plurality of sequence data in image data to allow the sequence data to correspond to display settings in the equipment, and a display method for the equipment.

In order to achieve the first object, according to the first main aspect of the present invention, there is provided a portable information terminal equipment with a browser function, comprising image information acquisition means for acquiring image information constituted by at least image data and display sequence information of the image data from a Web server through a communication line, storage means for storing the image information acquired by the image acquisition means, and display means for displaying image data on the basis of the display sequence information contained in the image information stored in the storage means.

The portable information terminal equipment according to the first main aspect has the following secondary aspects.

The image information includes title information of image data, a data size of a background image and an image count of background images, display setting correspondence information for each operation of each function of the portable information terminal equipment, display sequence information, data of at least one background image, and data of at least one controlled image.

The display sequence information includes sequence start information used to start display sequence processing of a plurality of pieces of sequence information for controlling display of controlled images, and sequence end information used to end the display sequence processing.

The sequence information includes image switching time information for setting a controlled image switching time, display image number information for designating a controlled image number, display position information for setting display position information of a controlled image, image inversion display information for setting whether to perform inversion display of a control image, image tilt information for setting whether to perform rotation display of a controlled image, and erase/non-erase information for setting whether to erase a controlled image upon switching of display of the controlled image.

The sequence information includes sound generation setting information for generating a sound when an arbitrary one of controlled images is displayed.

The equipment further comprises display setting means for performing display setting by making different pieces of image information correspond to functions for the respective functional operations of the portable information terminal equipment.

In order to achieve the second object, according to the second main aspect of the present invention, there is provided a display method for a portable information terminal method with a browser function, comprising the image information acquisition step of acquiring image information constituted by at least image data and display sequence information of the image data from a Web server through a communication line, the storage step of storing the image information acquired in the image acquisition step, and the display step of displaying image data on the basis of the display sequence information contained in the image information stored in the storage step.

The display method for the portable information terminal equipment according to the second main aspect has the following secondary aspects.

The image information includes title information of image data, a data size of a background image and an image count of background images, display setting correspondence information for each operation of each function of the portable information terminal equipment, display sequence information, data of at least one background image, and data of at least one controlled image.

The display sequence information includes sequence start information used to start display sequence processing of a plurality of pieces of sequence information for controlling display of controlled images, and sequence end information used to end the display sequence processing.

The sequence information includes image switching time information for setting a controlled image switching time, display image number information for designating a controlled image number, display position information for setting display position information of a controlled image, image inversion display information for setting whether to perform inversion display of a control image, image tilt information for setting whether to perform rotation display of a controlled image, and erase/non-erase information for setting whether to erase a controlled image upon switching of display of the controlled image.

The sequence information includes sound generation setting information for generating a sound when an arbitrary one of controlled images is displayed.

The method further comprises the display setting step of performing display setting by making different pieces of image information correspond to functions for the respective functional operations of the portable information terminal method.

According to the present invention, there is provided a portable information terminal equipment which has a browser function, can acquire image data used for a standby window or used during a standby period or at the time of transmission and reception of mail or origination and termination of a telephone call from the server side, and can perform display settings with respect to the acquired image data. The function of this equipment is to perform display control on characters corresponding to the respective functional operations on the basis of display sequence information for defining background images used to display image data, a controlled image (to be referred to as character data hereinafter) to be actually operated, and an action of a character.

A plurality of operations such as origination and termination of a telephone call and a plurality of pieces of display sequence information interlocked with each operation are prepared in image data. An operation pattern of characters to be displayed is calculated from settings that designate a specific image for a specific operation, and display control is performed at the time of each operation on the basis of the display sequence information.

As is obvious from each aspect described so far, according to the present invention, since images are displayed on the basis of display sequence information in image information acquired from the server side, a program for displaying an image for each functional operation such as, for example, telephone call originating or terminating operation can be reduced.

In addition, according to the present invention, since a plurality of images to be displayed and a plurality of pieces of sequence information for display operation can be prepared in image information acquired from the server side, image data required for each function as in the prior art can be deleted. As a consequence, the memory capacity to be used can be greatly reduced.

Furthermore, according to the present invention, since a plurality of images to be displayed and a plurality of sequence information of display operation can be written in image information acquired from the server side, image data can be efficiently created.

According to the present invention, since a plurality of pieces of sequence information can be written in image information acquired from the server side, one image data can be shared among a plurality of functions, and display switching can be performed for each functional operation.

Moreover, according to the present invention, by writing a plurality of pieces of sequence information in image information acquired from the server side, a plurality of functions can be discriminated from each other by display images even if one image data is shared among the functions.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A preferred embodiment of the present invention will be described below with reference to the accompanying drawings.

Figure 1:
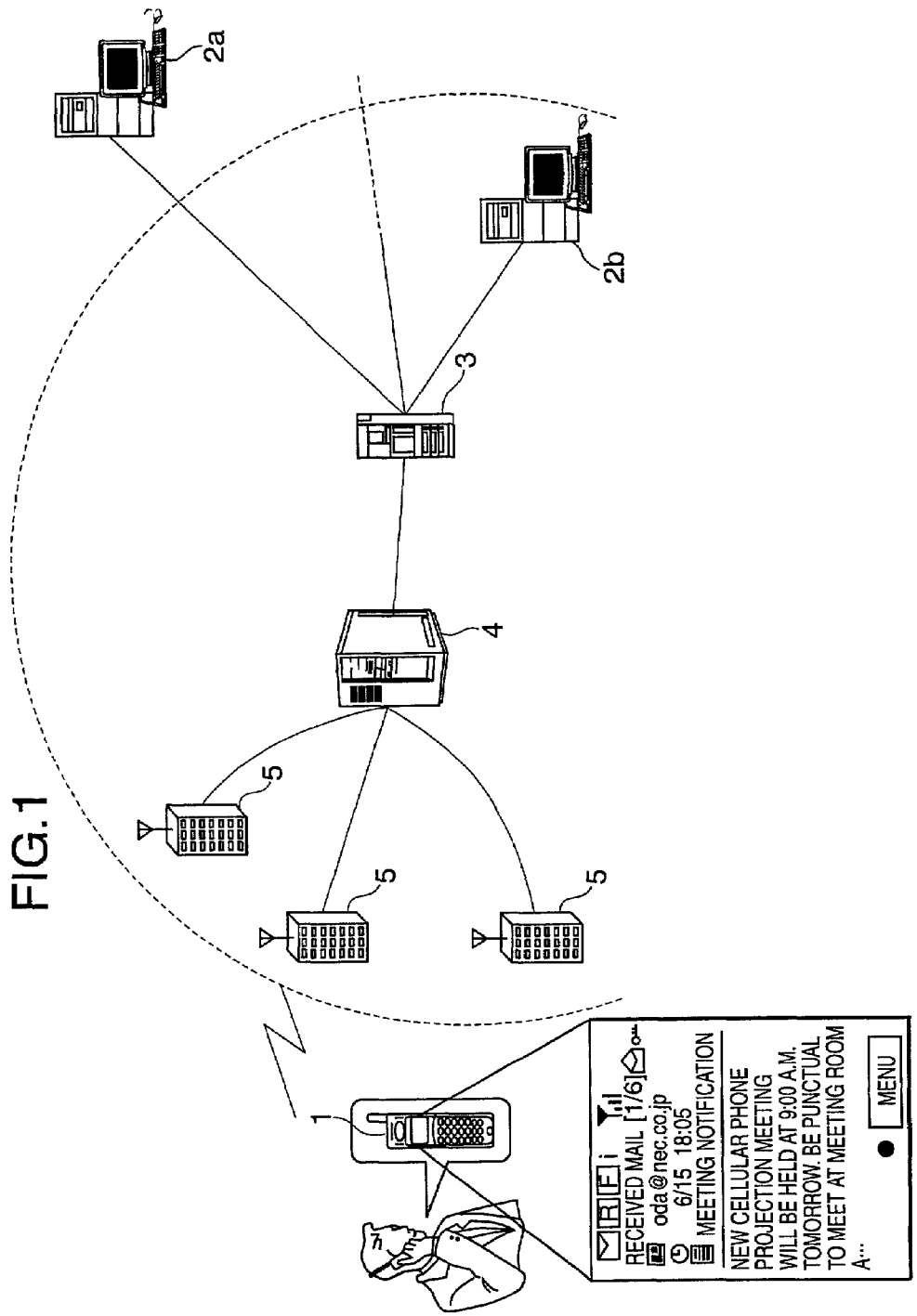
FIG. 1 is a conceptual view showing a network according to a preferred embodiment of the portable information terminal equipment of the present invention.

FIG. 1 is a conceptual view showing the schematic arrangement of a communication system using a portable information terminal equipment according to an embodiment of the present invention. As shown in FIG. 1, a portable information terminal equipment 1 according to the present invention acquires desired image information from a Web server 2a on a network through a gateway 3, exchange 4, and radio base station 5. Reference numeral 2b shows a mail server.

Figure 2:
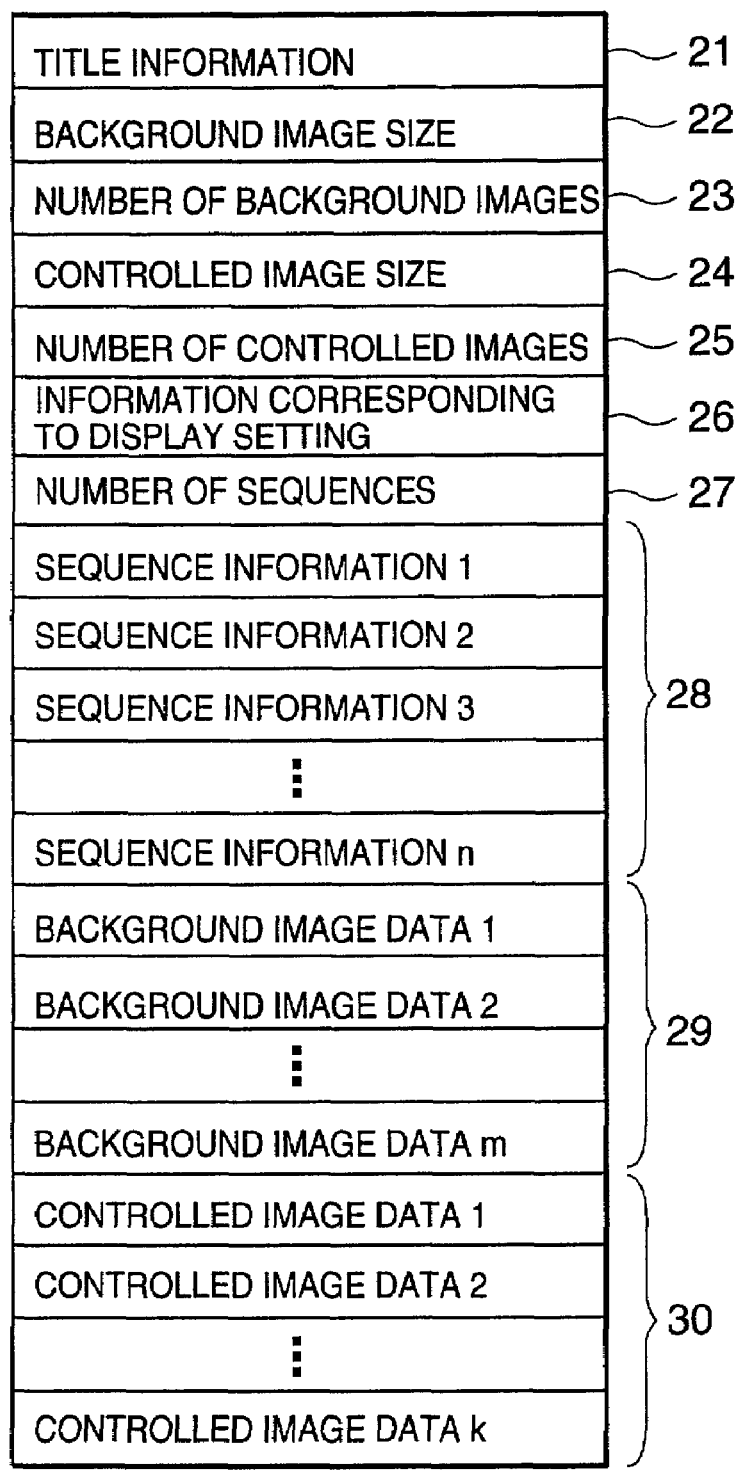
FIG. 2 is a view showing the arrangement of image information in the embodiment of the present invention.

FIG. 2 is a view showing items of image information which are acquired from a Web server by the portable information terminal equipment according to the embodiment of the present invention. As shown in FIG. 2, the acquired items of image information include title information 21, background image size 22, the number of background images 23, controlled image size 24, the number of controlled images 25, information corresponding to display setting 26, the number of sequences 27, sequence information 28, background image data 29, and controlled image data 30.

The title information 21 is a title for identifying image information. The background image size 22 is the data size of an image used as a background. The number of background images 23 is the number of images used as a background. The controlled image size 24 is the data size of an image (controlled image) controlled on the basis of sequence information. The number of controlled images 25 is the number of images used as controlled images. The display setting correspondence information 26 includes information indicating whether a given image can be displayed or not for a specific function, information indicating whether given sequence information or background image can be used or not for a specific function, and the like in the portable information terminal equipment. The number of sequences 27 is the number of pieces of sequence information. The sequence information (1 to n) 28 is information about a processing sequence such as a display sequence in displaying controlled images. The background image data (1 to m) 29 are image data as background image data whose settings can be changed by the user. The controlled image data (1 to k) 30 are image data whose display sequence is controlled on the basis of the respective pieces of sequence information of the sequence information 28.

Figure 3:
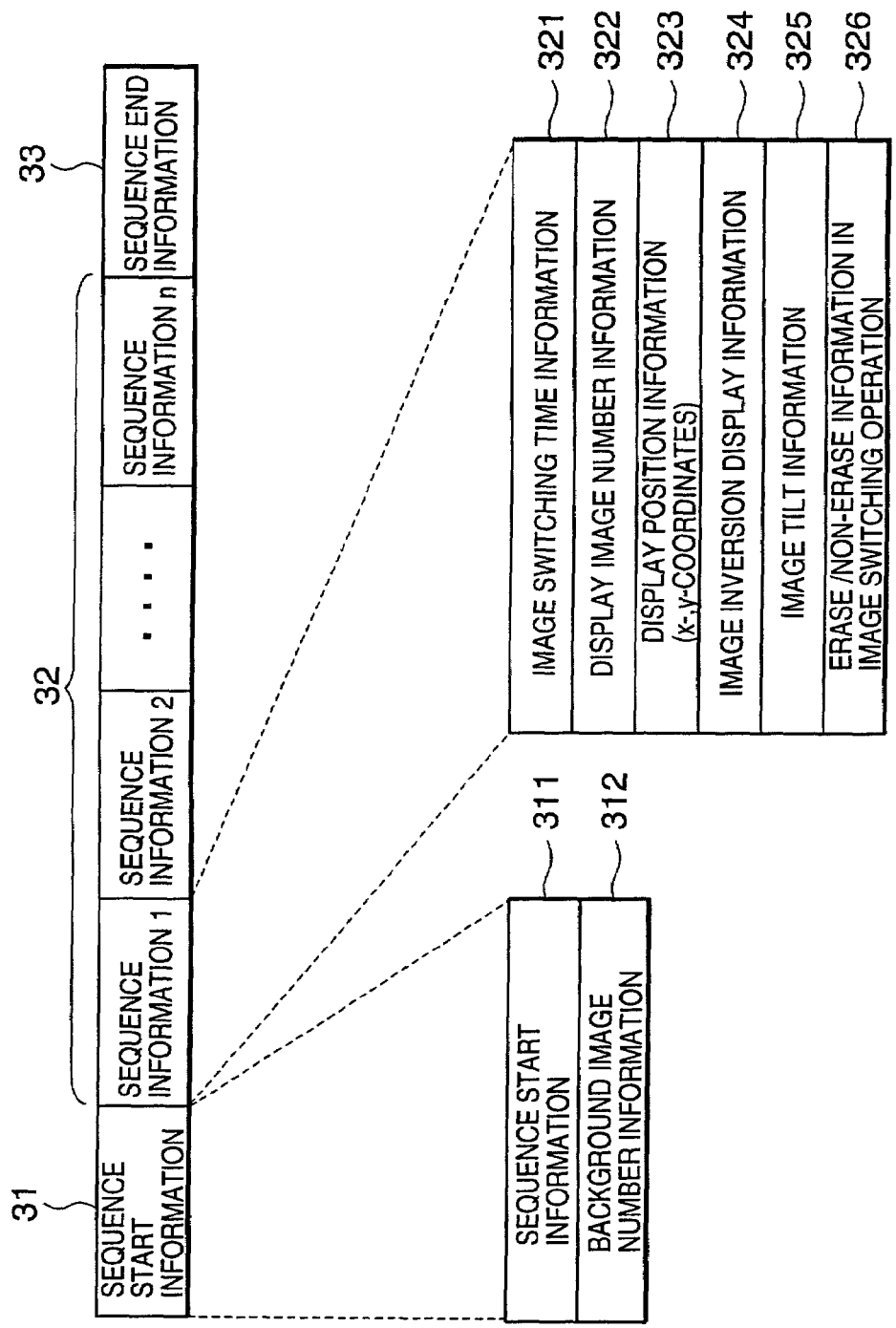
FIG. 3 is a view showing the arrangement of sequence information in the embodiment of the present invention.

FIG. 3 is a view showing items of sequence information in the embodiment of the present invention. This sequence information is information used to actually display an image acquired from the Web server by using the browser function. As shown in FIG. 3, the items of this sequence information include sequence start information 31, sequence information (1 to n) 32, and sequence end information 33.

The sequence start information 31 includes sequence start information 311 indicating the start of a sequence and background image number information 312 of an image to be displayed as a background image. The sequence information 32 includes image switching time information 321, display image number 322, display position information (x and y coordinates) 323, image inversion display information 324, image tilt information 325, and erase/non-erase information 326 in image switching operation.

Figure 4:
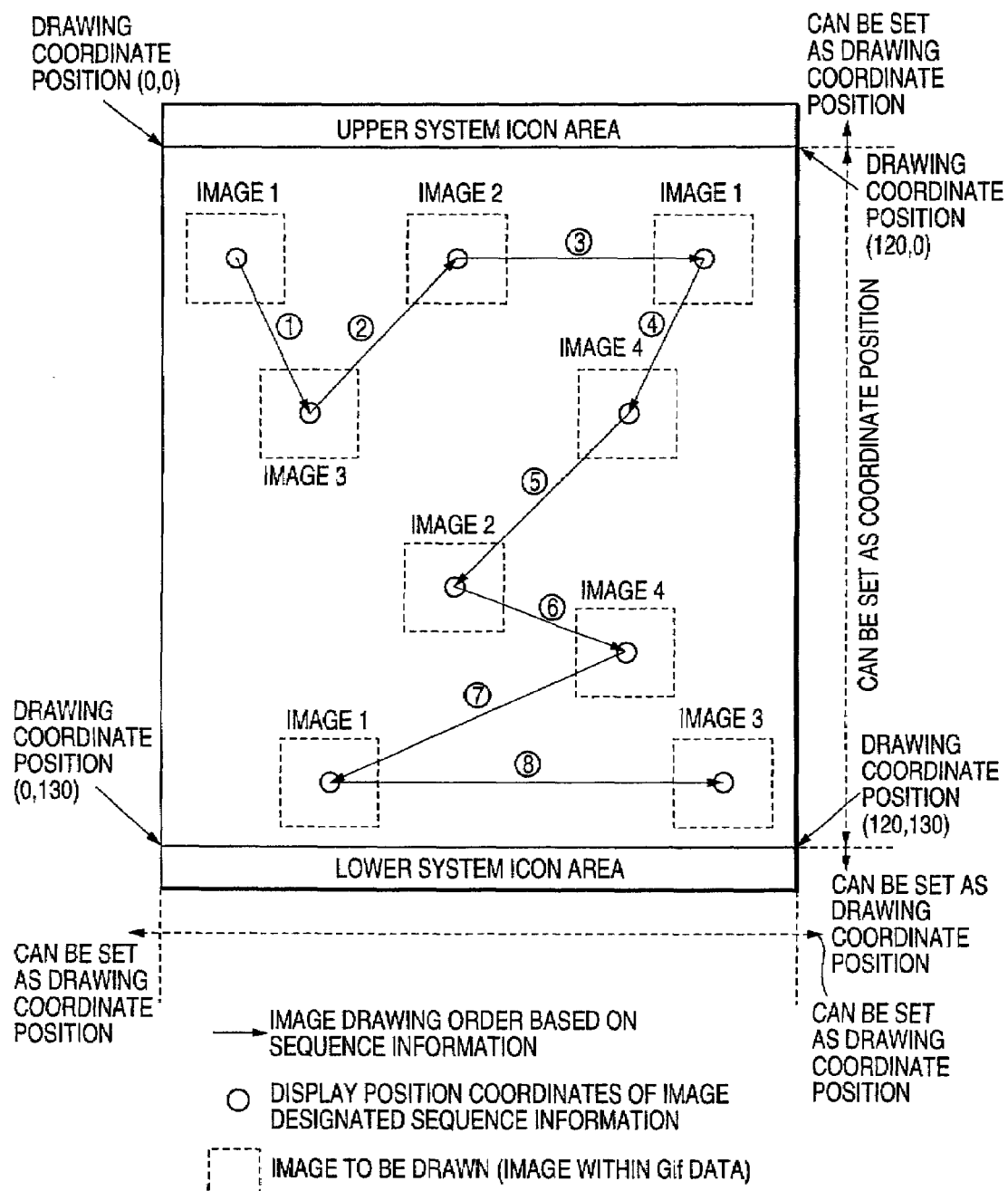
FIG. 4 is a view showing an example of drawing operation based on sequence information in the embodiment of the present invention.

Drawing processing based on sequence information in the portable information terminal equipment according to the embodiment of the present invention will be described next with reference to FIGS. 4 to 8. FIG. 4 is a plan view showing an example of how images are drawn in the portable information terminal equipment according to the embodiment of the present invention. As shown in FIG. 4, when display operation proceeds from the upper left on the screen to the lower right end on the screen by using a plurality of images in a zigzag pattern, the intervals between the respective images and their drawing positions are set by using the image switching time information, display position information, and the like of the sequence information shown in FIG. 3.

Figures 5A, 5B:
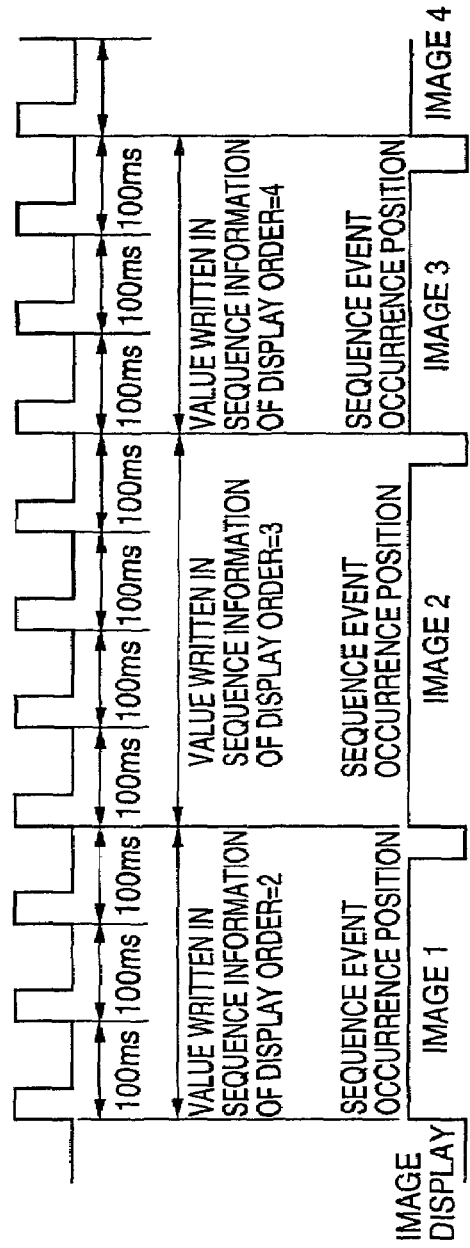
FIG. 5A is a view showing a display sequence and the like of images in the embodiment of the present invention.
FIG. 5B is a timing chart for drawing operation in the embodiment of the present invention.

FIG. 5B is a timing chart showing drawing processing based on sequence information. For the image to be displayed first, the switching time is set to 0 because there is no preceding image as shown in FIG. 5. The image switching time is the time that has elapsed after the image represented by immediately preceding sequence information is displayed. In drawing an image, the display time of the image to be drawn is calculated from sequence information about the image to be drawn and sequence information about an image to be drawn next.

Sequence information can further include sound generation setting information for generating a sound in accordance with arbitrary image data to be displayed. If, for example, settings are made to generate no sound for the controlled image corresponding to display ordinal number 1 and generate a sound for controlled image corresponding to display ordinal number 2, a sound is generated when controlled image corresponding to display ordinal number 2 is displayed.

Figure 6:
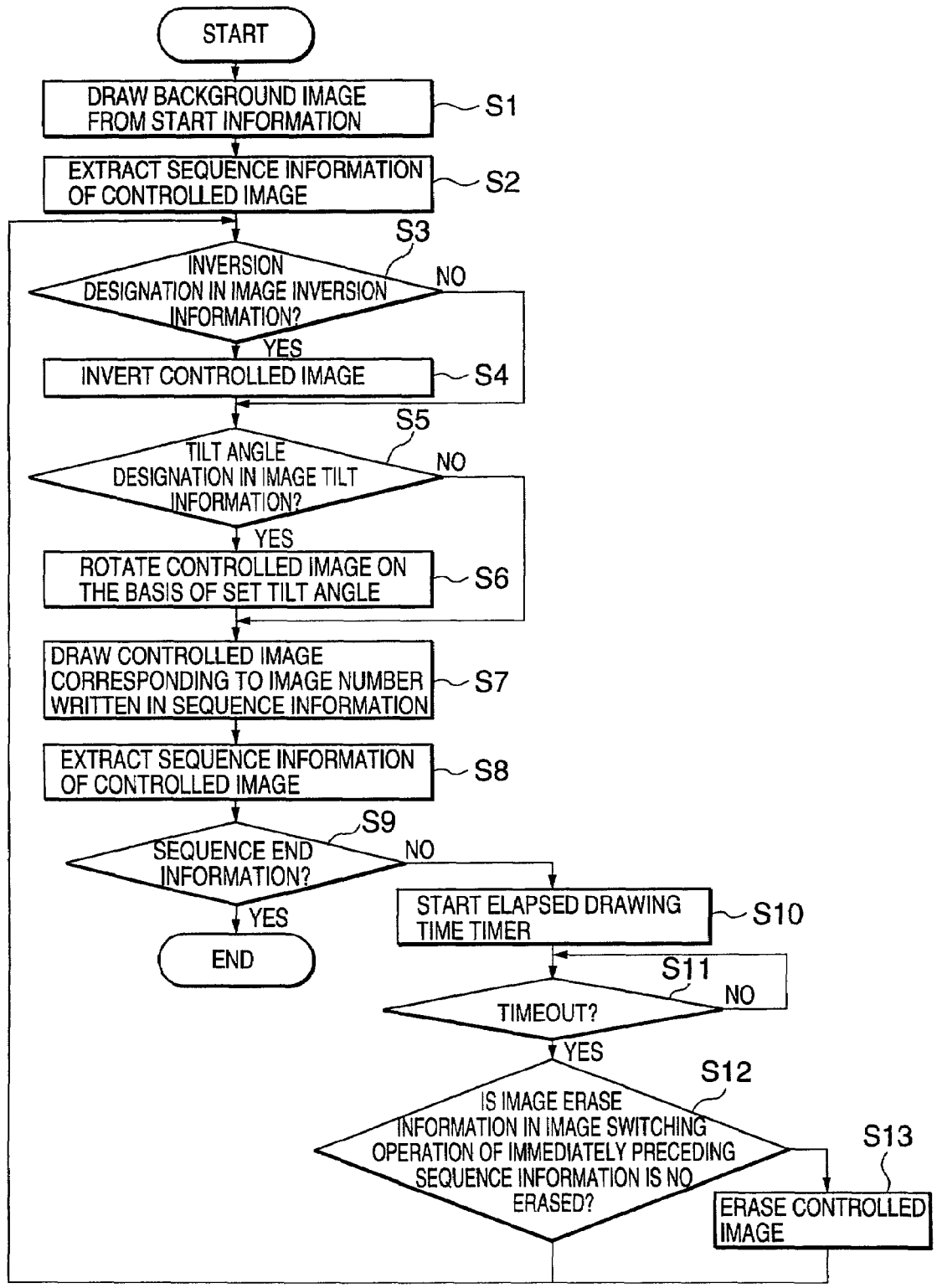
FIG. 6 is a flow chart showing an example of drawing processing in the embodiment of the present invention.

FIG. 6 is a flow chart showing an example of drawing processing in the embodiment of the present invention. First of all, background image information is acquired from sequence start information to render an image (step S1). When drawing of the background image is complete, the first sequence information is extracted (step S2). It is checked whether there is an image inversion display designation in the extracted sequence information (step S3). If the presence of an inversion display designation is determined in step S3, inversion processing of the controlled image is performed (step S4). If there is no inversion display designation, the controlled image is used without any change.

It is then checked whether there is a tilt angle designation in image tilt information (step S5). If tilt information is designated, a tilt angle is calculated, and the controlled image is rotated in accordance with the tilt angle (step S6). If no tilt information is designated in step S5, the controlled image is used without any change.

Subsequently, the unprocessed or processed controlled image in the sequence information is drawn on the actual screen (step S7). When drawing is complete, sequence information about the next controlled image is acquired to calculate an image switching time (step S8), and it is checked whether the acquired sequence information is sequence end information (step S9). If it is determined in step S9 that the acquired sequence information is sequence end information (YES in step S9), and the acquired sequence information is sequence information used to render the next image (NO in step S9), image switching time information is acquired, and an elapsed drawing time timer is started (step S10).

The elapsed drawing time timer is monitored until the timer causes timeout (step S11). After the elapsed drawing time timer causes timeout, image erase/non-erase information at the time of switching in the sequence information of the currently displayed image is checked (step S12). If the image erase/non-erase information at the time of switching in the sequence information indicates "erase" (NO in step S12), the currently displayed image is erased (step S13), and the flow advances to drawing processing for the next image. If the image erase/non-erase information at the time of switching in the sequence information indicates "non-erase" (YES in step S12), the flow advances to drawing processing for the next image while the currently displayed image is kept displayed.

Figure 7A:
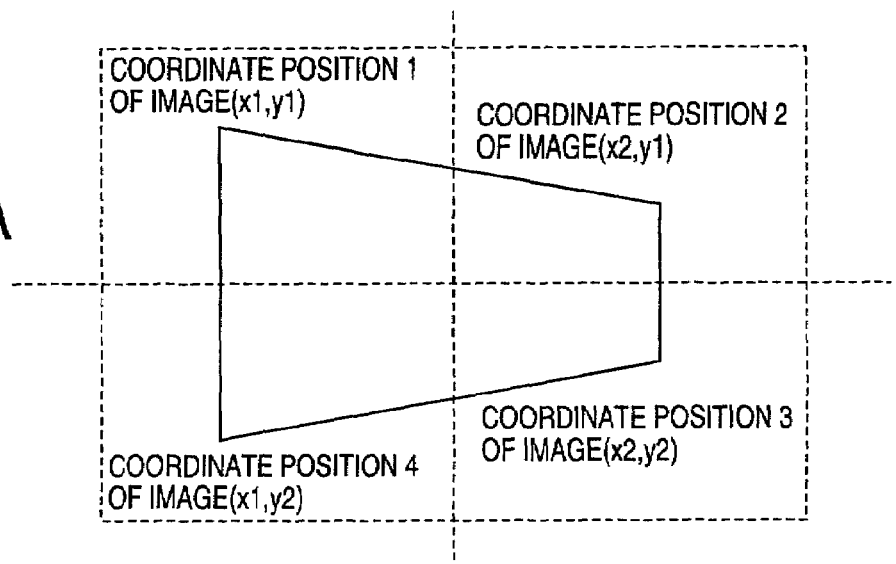
FIGS. 7A and 7B are plan views showing respectively an example of inversion drawing processing in the embodiment of the present invention.
Figure 7B:
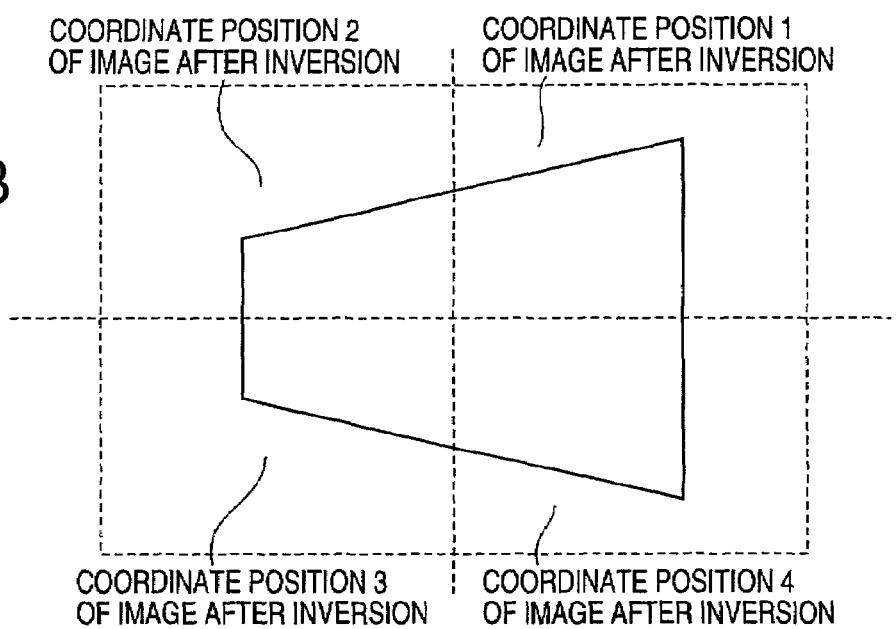

FIGS. 7A and 7B are views for explaining respectively inversion drawing processing in the embodiment of the present invention.

Referring to FIG. 7A, assume that coordinate position 1 (x1, y1), coordinate position 2 (x2, y1), coordinate position 3 (x2, y2), and coordinate position 4 (x1, y2) which are the respective drawing coordinate positions of an original image are subjected to holizontal inversion processing. In this case, if, for example, the upper left coordinate position of an image subjected to the conversion processing is set to (0, 0), the processing is performed on the basis of the following processing program:

```
for (i = 1 ; i <= end X-coordinate ; i ++) {
    for (j = 0; j <= end Y-coordinate ; J;;) {
        inverted image [end X-coordinate - i,
            j] = original image [i, j];
    }
}
```

FIG. 7B show an image after the inversion drawing processing.

Figure 8:
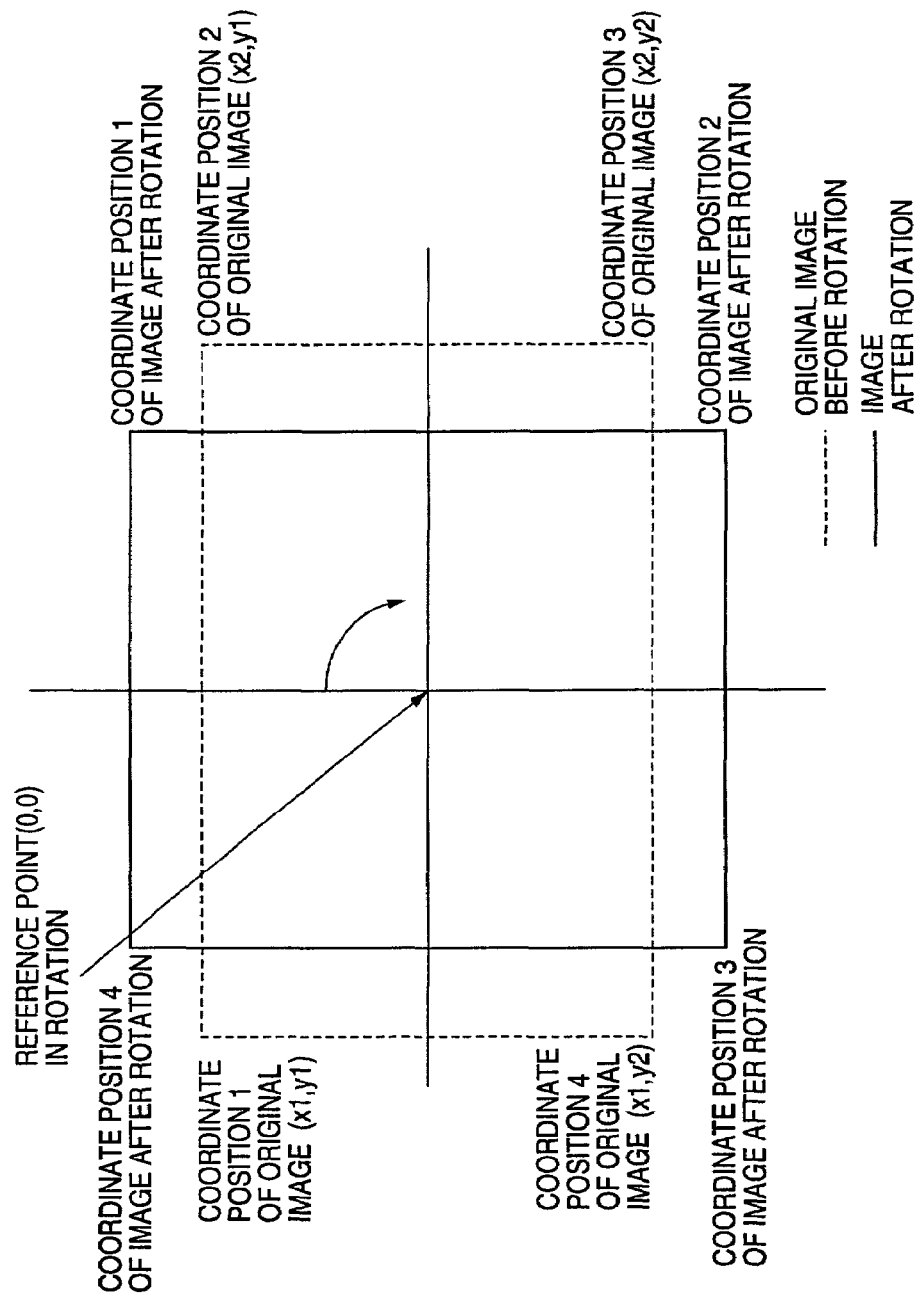
FIG. 8 is a plan view showing an example of rotation drawing processing in the embodiment of the present invention.

FIG. 8 is a view for explaining an example of rotation drawing processing in the embodiment of the present invention.

Referring to FIG. 8, assume that coordinate position 1 (x1, y1), coordinate position 2 (x2, y1), coordinate position 3 (x2, y2), and coordinate position 4 (x1, y2) which are the respective drawing coordinate positions of an original image before rotation are subjected to rotation processing. In this case, if a reference point (0, 0) is set for rotation, the respective drawing coordinate positions are calculated by the following processing.

<for 90 degrees>
X-coordinate after conversion=y-coordinate before conversion×SIN($\pi/2$)
Y-coordinate after conversion=x-coordinate before conversion×SIN($\pi/2$)

<for 180 degrees>
X-coordinate after conversion=y-coordinate before conversion×COS($\pi$)
Y-coordinate after conversion =x-coordinate before conversion×COS($\pi$)

<for 270 degrees>
X-coordinate after conversion=y-coordinate before conversion×SIN($2\times\pi/2$)
Y-coordinate after conversion=x-coordinate before conversion×SIN ($2\times\pi/2$)

As described above, in performing image inversion display or rotation display, there is no need to store inverted or rotated image data in a memory as in the prior art. More specifically, an inverted or rotated image is calculated from the drawing coordinates of acquired image data, and the calculated image is displayed. Therefore, only data about the calculation scheme may be stored. This makes it possible to greatly reduce the memory capacity used and also shorten the download time for the acquisition of image information.

In addition, the portable information terminal equipment according to the embodiment of the present invention can assign various operation functions to the respective pieces of sequence information contained in one image information acquired through a communication line. Therefore, one character data can be displayed in different display patterns for terminating operation, originating operation, mail receiving operation, and the like, and each operation condition can be determined from the action of a displayed character.

The above embodiment is a preferred embodiment of the present invention, and various modifications of this embodiment can be made within the spirit and scope of the present invention. If, for example, image information such as character information is acquired from a Web server and is used for a portable mail terminal or game terminal capable of displaying images on its display section, an image can be displayed in accordance with each function without creating any image display program for each function operation in each terminal. In addition, since there is no need to prepare image data for each function, the memory for storing image information can be efficiently used.

What is claimed is:

1. A portable information terminal equipment with a browser function, said portable information terminal equipment comprising:
   an image information acquisition section for downloading image information from a Web server through a communication line to said portable information terminal equipment, the image information comprising image data and display sequence information of the image data;
   a storage section for storing the downloaded image information;
   a display section for displaying stored image data on the basis of the stored display sequence information; and
   a display control section for controlling the image on the display section,
   wherein the stored display sequence information comprises sequence control information for controlling display of controlled images, the sequence control information comprising at least one of:
      image switching time information for setting a controlled image switching time;
      image inversion display information for setting whether to perform inversion display of a controlled image; and
      erase/non-erase information for setting whether to erase a controlled image upon switching of the display of the controlled image.

2. An equipment according to claim 1, wherein the image information comprises:
   title information of the image data;
   a data size of a background image;
   an image count of background images;
   display setting correspondence information for each operation of each function of the portable information terminal equipment;
   display sequence information;
   data of at least one background image; and
   data of at least one controlled image.

3. An equipment according to claim 1, further comprising display setting means for performing display setting by making different pieces of image information correspond to functions for the respective functional operations of the portable information terminal equipment.

4. An equipment according to claim 1, wherein the display sequence information further comprises:
   sequence start information for starting display sequence processing; and
   sequence end information for ending the display sequence processing.

5. An equipment according to claim 4, wherein the sequence control information comprises:
   image switching time information for setting a controlled image switching time;
   display image number information for designating a controlled image number;
   display position information for setting a display position of a controlled image;
   image inversion display information for setting whether to perform inversion display of a controlled image;
   image tilt information for setting whether to perform rotation of the display of a controlled image; and
   erase/non-erase information for setting whether to erase a controlled image upon switching of the display of the controlled image.

6. An equipment according to claim 4, wherein the sequence control information further includes sound generation setting information for generating a sound when one of the controlled images is displayed.

7. A display method for a portable information terminal equipment with a browser function, said display method comprising:

downloading image information from a Web server through a communication line to the portable information terminal equipment, the image information comprising image data and display sequence information of the image data;

storing the downloaded image information; and displaying stored image data on the basis of the stored display sequence information, wherein the display sequence information comprises sequence control information for controlling display of controlled images, the sequence control information comprising at least one of:

image switching time information for setting a controlled image switching time;

image inversion display information for setting whether to perform inversion display of a controlled image; and erase/non-erase information for setting whether to erase a controlled image upon switching of the display of the controlled image.

8. A method according to claim 7, wherein the image information comprises:

title information of image data;

a data size of a background image;

an image count of background images;

display setting correspondence information for each operation of each function of the portable information terminal equipment;

display sequence information;

data of at least one background image; and data of at least one controlled image.

9. A method according to claim 7, wherein the display sequence information further comprises:

sequence start information for starting display sequence processing; and sequence end information for ending the display sequence processing.

10. A method according to claim 9, wherein the sequence control information comprises:

image switching time information for setting a controlled image switching time;

display image number information for designating a controlled image number;

display position information for setting a display position of a controlled image;

image inversion display information for setting whether to perform inversion display of a controlled image;

image tilt information for setting whether to perform rotation of the display of a controlled image; and erase/non-erase information for setting whether to erase a controlled image upon switching of display of the controlled image.

11. A method according to claim 9, wherein the sequence control information further comprises sound generation setting information for generating a sound when one of controlled images is displayed.

12. A method according to claim 7, further comprising making different pieces of image information correspond to functions for the respective functional operations of the portable information terminal apparatus.

13. A portable information terminal equipment with a browser function, said portable information terminal equipment comprising:

an image information acquisition section for downloading image information from a Web server through a communication line to said portable information terminal equipment, the image information comprising image data and display sequence information of the image data;

a storage section for storing the downloaded image information;

a display section for displaying stored image data on the basis of the stored display sequence information; and a display control section responsive to downloaded image tilt information, for controlling the display on the display section, wherein the display sequence information comprises sequence control information for controlling display of controlled images, the sequence control information comprising at least one of:

image switching time information for setting a controlled image switching time;

image inversion display information for setting whether to perform inversion display of a controlled image; and erase/non-erase information for setting whether to erase a controlled image upon switching of the display of the controlled image.

14. An equipment according to claim 13, wherein the image information comprises:

title information of the image data;

a data size of a background image;

an image count of background images;

display setting correspondence information for each operation of each function of the portable information terminal equipment;

display sequence information;

data of at least one background image; and data of at least one controlled image.

15. An equipment according to claim 13, wherein the display sequence information further comprises:

sequence start information for starting display sequence processing; and sequence end information for ending the display sequence processing.

16. An equipment according to claim 15, wherein the sequence control information comprises:

image switching time information for setting a controlled image switching time;

display image number information for designating a controlled image number;

display position information for setting a display position of a controlled image;

image inversion display information for setting whether to perform inversion display of a controlled image; and erase/non-erase information for setting whether to erase a controlled image upon switching of the display of the controlled image.

17. An equipment according to claim 15, wherein the sequence control information further includes sound generation setting information for generating a sound when one of the controlled images is displayed.

18. An equipment according to claim 13, further comprising display setting means for performing display setting by making different pieces of image information correspond to functions for the respective functional operations of the portable information terminal equipment.

* * * * *